March 23, 1965   E. D. WILSON   3,174,517
BENDING TOOL
Filed July 25, 1962

INVENTOR.
EDGAR D. WILSON
BY
George J. Rubens
ATTORNEY

United States Patent Office 3,174,517
Patented Mar. 23, 1965

3,174,517
BENDING TOOL
Edgar D. Wilson, 5239 Aurora Drive, Ventura, Calif.
Filed July 25, 1962, Ser. No. 212,498
4 Claims. (Cl. 140—123)
(Granted under Title 35, U.S. Code (1952), sec. 266)

The invention described herein may be manufactured and used by or for the Government of the United States of America for governmental purposes without the payment of any royalties thereon or therefor.

This invention generally relates to bending tools, and more particularly to a bending tool that can form tubes, rods etc. accurately and quickly into any predetermined configuration.

There are many different methods of bending workpieces, such as by die and form block, jig and fixture, and rolling-type hand tools. The bench type methods are not readily portable and are therefore limited in use. The hand-type devices heretofore employed are either limited to a single diameter bend; require a large working radius for the handle which wraps around the workpiece by means of a roller and the like; and are unable to produce a 360° bend.

The instant invention provides a simple and convenient tool for bending an elongate workpiece in confined work areas. The tool comprises a mandrel having formed on the exterior surface a groove corresponding to the cross-section and the final configuration of the workpiece. Movably mounted over the mandrel is a sleeve which is adapted to be forced over the groove to conform the workpiece placed therein to the same configuration as the groove. Indicia can be provided on the sleeve to indicate the degree of the bend achieved on the workpiece. The finished workpiece can be made circular, noncircular, and bent to any angle less or more than 360 degrees, an example of the latter being a helix.

An important object of the invention is to provide a tool, suitable for hand or power operation, which is versatile in use and can be utilized to form a workpiece into a plurality of desired configurations.

Another object is to provide a bending tool which requires a minimum of work space to be usable in confined areas.

Still another object is to provide a bending tool which is simple and inexpensive to fabricate; and which is particularly suitable for workpieces of limited production.

Other objects and many of the attendant advantages of this invention will be readily appreciated as the same becomes better understood by reference to the following detailed description when considered in connection with the accompanying drawings wherein.

Figure 6:
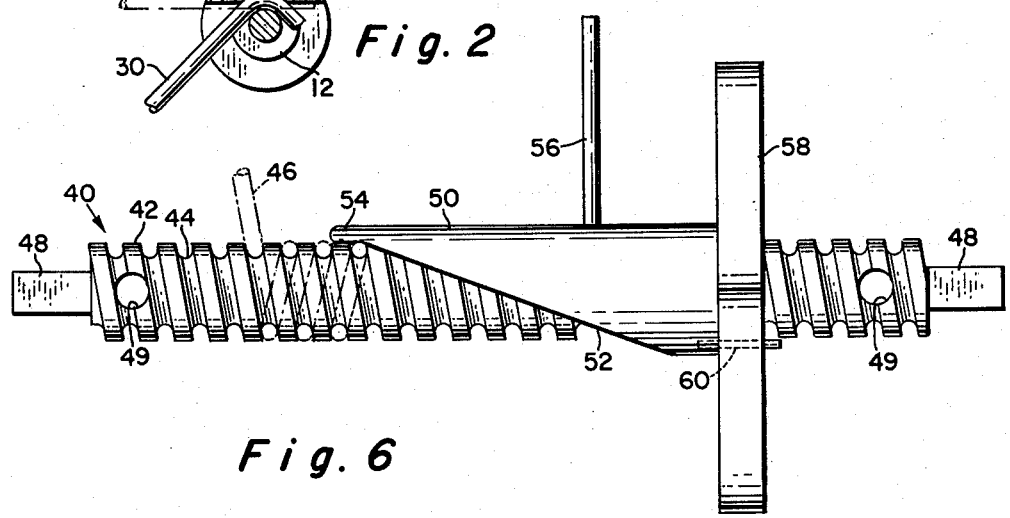
Figure 3:
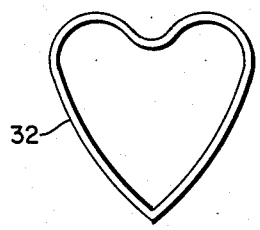
Figure 4:
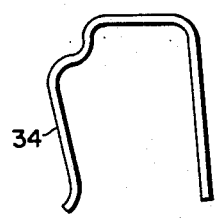
Figure 5:
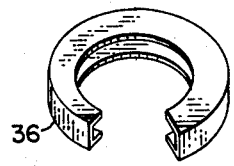

FIGS. 3, 4, and 5 are samples of finished workpieces that can be formed using the invention tool; and FIG. 6 is a side elevation view of a modified bending tool for forming a helix.

Figure 1:
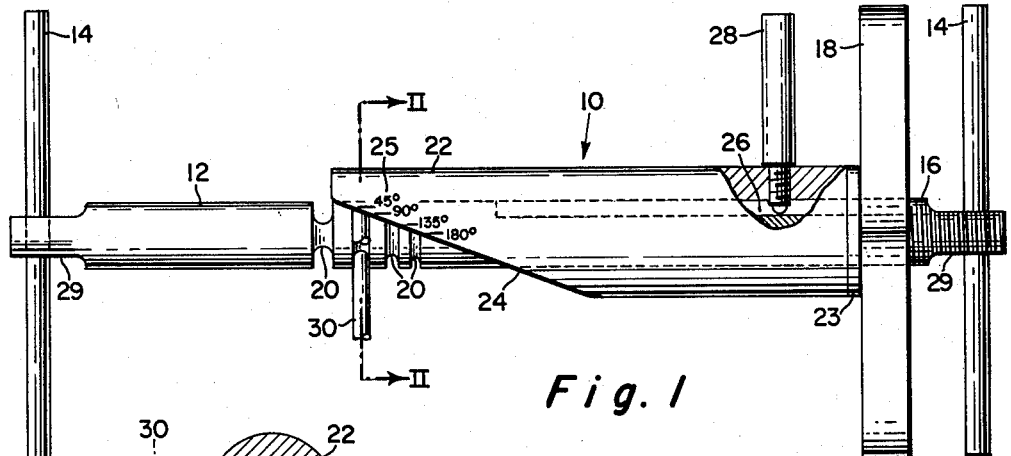
FIG. 1 is a side elevation view of a bending tool constructed according to the invention showing a workpiece being bent to a 90 degree angle.
Figure 2:
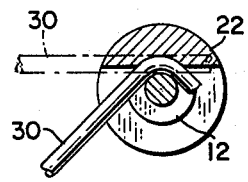
FIG. 2 is a cross-section taken along line II—II of FIG. 1.

Referring to the drawing wherein like reference numerals refer to similar parts throughout the drawing, there is illustrated in FIGS. 1 and 2, a bending tool 10 comprising a mandrel 12 having removable pins 14 extending through both ends and serving as handles, the mandrel being threaded at 16 to receive a wing nut 18. Intermediate the ends the outer surface of the mandrel is formed with a plurality of annular grooves 20 to accommodate different sizes of rods, tubes, etc. The workpiece should fit snugly in its respective groove and not project significantly beyond the outer surface of the mandrel. In the modification of FIGS. 1 and 2, the mandrel is cylindrical and the grooves are circular and extend entirely around the mandrel, each groove lying in a plane perpendicular to the longitudinal axis of the mandrel and capable of making any circular bend up to a 360 degree. It should be noted that grooves 20 can be made noncircular in either transverse section or in plan view depending on the particular configuration desired in the final workpiece.

Movably mounted on mandrel 12 is a sleeve 22 having a smooth bore for a close sliding fit on mandrel 12, the sleeve being advanced over the mandrel by nut 18 through a washer 23. The leading edge of the sleeve is bevelled to provide a sloping face 24 gradually to engage a workpiece placed in the appropriate groove 20. In this modification it has been found that a tapered face of about 14 degrees with the longitudinal axis of the mandrel will work satisfactorily in bending the workpiece, whereas a greater angle has a tendency to shear the workpiece unless the grooves are formed in a plane forming an obtuse angle with the longitudinal axis of the mandrel.

Face 24 can be made concave to remove any sharp corners on the inner edge from cutting into the workpiece. The degree of bend of the workpiece in FIGS. 1 and 2 can be determined by indicia 25 on the edge of the tapered face.

Relative rotation of sleeve 22 on mandrel 12 can be prevented by machining a longitudinal slot 26 on the mandrel into which is adapted to ride an end of a pin 28 threadedly extending into the sleeve, the pin also serving as a handle to support the sleeve. The ends of mandrel 12 can be flattened at 29 for support in a vise.

To make a bend with the invention tool, a workpiece 30 is placed into one of the appropriate grooves 20 with the point of tangency in the center of the band as well as the center of the leading edge of face 24. This initial position of the workpiece 30 is represented by the broken-line position in FIG. 2. Sleeve 22 is slid along mandrel 12 until the tapered face bears evenly against the workpiece in which position the workpiece will most likely be supported solely by the tip of the sleeve. Screw wing nut 18 until washer 23 bears lightly against sleeve, grip handle 14 in one hand and tighten the wing nut with the other hand, turning slowly until the desired angle of bend is achieved as indicated by scale indicia 25 on the tapered edge of sleeve 22. As indicated in FIG. 1, and shown in FIG. 2, a 90 degree bend has been formed, but any other degree of bend up to 360° could be likewise formed. The workpiece will experience a certain amount of springback which will vary with shape and elasticity of the chosen material of the workpiece. Normally, a few degrees of "over travel" and a little practice will account for any springback. Application of a lubricant on the working parts will prevent scuffing or galling of the workpiece surfaces. For very sharp bends, or for materials having thin walls or low ductility, the same preparation should be made as for any other type of bending, namely using "Cerrobend," springs etc. inserted into the workpiece to prevent the walls from collapsing and to minimize cross-sectional distortion along the length of the bend.

As appears from FIG. 1, a plurality of different shaped grooves 20 may be formed on mandrel 12 in adjacent relation with a relatively small range of diameters. Should another set of grooves be desired of a larger diameter, the set could be formed on the outside surface of sleeve 22 which would function as a mandrel for another sleeve, not shown, telescopically mounted on sleeve 22 and similar in shape.

The invention tool is not limited to forming curves of symmetry, constant radii or cross-section. For example FIG. 3 illustrates a rod workpiece bent into a heart-shape piece 32. FIG. 4 a split U-shaped article 34, while FIG. 5 illustrates a split channel-shaped bend 36. Of course, for each of the configurations of FIGS. 3–5 the respective mandrel and sleeve would have to be configured accordingly.

FIG. 6 shows an embodiment of a tool 40 for bending helixes, such as might be employed for RF loading coils, springs, pig tails for pressure lines, heating, cooling coils and etc. A mandrel 42 has a continuous spiral groove 44 formed as a helix, the groove being dimensioned in cross-section and having a lead angle to provide the desired configuration to a workpiece 46. The ends 48 of the mandrel may be squared for gripping in a vise, or apertured at 49 to receive handle pins, not shown. Slidably mounted on the mandrel is a sleeve 50, similar in construction to sleeve 22, having a tapered face 52 with a projecting lip 54 for engaging the workpiece. A removable auxiliary handle 56 is threaded to sleeve 50 for independent rotation. A wing nut 58 is threaded on the mandrel using the grooves 44 as threads for advancing the sleeve over the workpiece. Sleeve 50 may be pinned at 60 to nut 58 so as to turn with the nut without which the sleeve may move in translation.

The bending tool of this invention provides a fast, convenient, economical and accurate method of bending workpieces of various configurations. Such a tool is ideal for bending smaller sizes of cross-sectional stock and where work in confined quarters is necessary. The tool components could be made of metal, wood or plastic. While the principle of the invention is utilized in a hand tool it could also be applied to power driven tools.

Obviously many modifications and variations of the present invention are possible in the light of the above teachings. It is therefore to be understood that within the scope of the appended claims the invention may be practiced otherwise than as specifically described.

I claim:

1. A bending tool for forming an elongate workpiece comprising:
   (a) a mandrel having a longitudinal axis and a transversal groove formed on the outer surface thereof conforming to the desired configuration of the workpiece;
   (b) a sleeve mounted on the mandrel and movable over the groove along the longitudinal axis thereof;
   (c) means for moving said sleeve along the mandrel;
   (d) a leading edge of the sleeve having an apex for engaging an intermediate point on the elongate workpiece, said leading edge having a tapered surface on each side of the apex formed at an acute angle respectively with a longitudinal line passing through the apex, so that the sleeve gradually advances over the respective sides of the workpiece;
   (e) whereby placing the intermediate point of the workpiece into the mandrel groove and forcing the sleeve over the workpiece will gradually bend both sides of the workpiece simultaneously around the mandrel to conform to the configuration of the groove.

2. The tool of claim 1 wherein said mandrel is a unitary member on which is formed a plurality of different configured grooves to accommodate different bending configurations.

3. The tool of claim 1 wherein said sleeve is slidably mounted on the mandrel, means interconnecting the sleeve and the mandrel for preventing relative rotation therebetween, and the means for advancing the sleeve is a nut threaded on the mandrel.

4. A bending tool for forming rod-like workpieces comprising:
   (a) a cylindrical mandrel made of a unitary member having a longitudinal axis and at least one transverse groove formed on the outer surface thereof conforming to the desired configuration of the workpiece;
   (b) a cylindrical sleeve slidably mounted on the mandrel along the longitudinal axis thereof and movable over the recess;
   (c) a nut threadedly mounted on the mandrel for moving said sleeve;
   (d) a leading edge of the sleeve having an apex for engaging an intermediate point on the elongate workpiece, said leading edge having a tapered surface on each side of the apex formed at an acute angle respectively with a longitudinal line passing through the apex, so that the sleeve gradually advances over the respective sides of the workpiece;
   (e) guide means between the sleeve and the mandrel to prevent relative movement therebetween;
   (f) whereby placing the intermediate point of the workpiece into the groove and forcing the sleeve over the workpiece will gradually bend both sides of the workpiece simultaneously around the mandrel to conform to the configuration of the groove.

References Cited by the Examiner

UNITED STATES PATENTS

| 1,505,347 | 8/24 | Hoyt | 153—67 |
| 1,526,716 | 2/25 | Neunherz | 140—104 XR |
| 2,593,083 | 4/52 | Adamo | 140—104 XR |
| 2,864,272 | 12/58 | Swanson | 140—102 XR |
| 2,943,650 | 7/60 | Rubin | 140—119 |
| 3,051,202 | 8/62 | Kitselman | 140—92.94 XR |
| 3,127,921 | 4/64 | Kusisto | 153—48 |

CHARLES W. LANHAM, *Primary Examiner.*

KINGSLEY C. PECK, *Examiner.*